United States Patent [19]

Yoshimoto et al.

[11] Patent Number: 4,917,973
[45] Date of Patent: Apr. 17, 1990

[54] SECONDARY BATTERY

[75] Inventors: Yoshikazu Yoshimoto; Hiroshi Wada; Tomonari Suzuki; Masaru Yoshida; Shigeo Nakajima, all of Nara, Japan

[73] Assignee: Sharp Kabushiki Kaisha, Osaka, Japan

[21] Appl. No.: 381,262

[22] Filed: Jul. 18, 1989

Related U.S. Application Data

[63] Continuation of Ser. No. 254,029, Oct. 6, 1988, abandoned.

[30] Foreign Application Priority Data

Oct. 6, 1987 [JP] Japan .............................. 62-253365
Oct. 6, 1987 [JP] Japan .............................. 62-253366

[51] Int. Cl.[4] .............................................. H01M 2/12
[52] U.S. Cl. ...................................... 429/91; 429/218; 350/357
[58] Field of Search ........................... 429/90, 91, 218; 350/357

[56] References Cited

U.S. PATENT DOCUMENTS 3,955,879  5/1976  Witzke et al. ................ 350/357
4,522,901  6/1985  Shacklette ................... 429/194

OTHER PUBLICATIONS

Pflurer et al, "Aspects of Alkali Metal Intercalation and Deintercalation in Highly Oriented Pyrolytic Graphite", *Synthetic Metals*, v. 3, pp. 27–39, 1989.
Pfluger et al, "Discovery of a New Reversible Electrochromic Effect" *Applied Physics Letters*, vol. 35, No. 10, pp. 771–772, Nov. 15, 1979.

*Primary Examiner*—Stephen J. Kalafut

[57] ABSTRACT

There is disclosed a secondary battery wherein either one of positive electrode and negative electrode elements is made of an active material, the color of which is changed according to a voltage between these electrodes and wherein a window is formed for observing the color change of the electrode.

Further, an electrochromic display device is disclosed in which a working electrode is made of a pyrolytic carbonaceous material which is obtained by thermal decomposition of a hydrocarbon compound at a low temperature of about 1,000° C.

2 Claims, 1 Drawing Sheet

SECONDARY BATTERY

This is a continuation-in-part application of the U.S. application Ser. No. 254,029, filed 10/6/88, abandoned.

BACKGROUND OF THE INVENTION

1. Field of the Invention

The present invention relates to a secondary battery capable of displaying the charge and discharge state thereof.

2. Description of the Prior Art

Recently, various electronic apparatuses of portable type are widely used and various secondary batteries suitable for these apparatuses have been developed and are available in the market.

However, from a practical view point, the prior art apparatuses have problems to be solved. One essential problem is that it is impossible to directly know the charge and discharge state of the secondary battery.

The charge and discharge state can be measured with use of a suitable measuring apparatus, but this method requires a measuring apparatus and is not convenient to each user.

In order to solve this problem, there has been proposed a detection method for detecting the charge and discharge state of the secondary battery which utilizes a color change according thereto (See, for example, JP-A No. 59-16283).

However, in this method, it becomes necessary to provide a display electrode other than essential elements of the secondary battery with use of a material, such as $WO_3$, $TiO_2$ or the like, the color of which is changed by a reversible electro-chemical reaction.

Due to this, the battery structure becomes very complicated, and is not advantageous for the production process therefor and the dimension thereof becomes bulky.

On the other hand, the electrochromic device is well known which assumes a specific color due to an electrochemical reversible reaction. Accordingly, the electrochromic device is applicable to a display device.

As an electrochromic display device, there has been known an electrochromic device which utilizes color change due to change in the stage structure of a graphite intercalation compound.

As is well known, graphite has a layered structure capable of forming an intercalation compound between adjacent layers thereof by regularly intercalating various atoms and/or molecules therebetween. The intercalation compound assumes a color specified by the kind of inserted atom or molecule and the stage structure thereof.

In Appl. Phys. Lett. 35 (1978) p 771 and Synth. Met. 3 (1981) p 27, P. Pfluger et al. proposed and tested an electrochromic display device which utilizes a color change caused by a reversible change in the stage structure of lithium-graphite intercalation compound having lithium of an alkali metal as the inserted atomic species.

In this display device, HOPG (highly oriented pyrolytic graphite produced by Union Carbide Corp.) is used for the working electrode, metallic lithium is used for the counter electrode and an organic solvent (liquid electrolyte) such as dimethylsulfoxide or $Li_3N$ of a solid ion conductor is used for the ion conduction layer which serves as an ion travelling layer for lithium ions.

FIG. 5 shows an example of the electrochromic display device manufactured for trial by P. Pfluger et al. wherein $Li_3N$ was used for the ion conduction layer.

This device has such a structure that a transparent electrode 32, a working electrode 33, an ion conduction layer 34, a counter electrode 35, an electrode 36 and a glass substrate 37 are formed stacked on a glass substrate 31. When a voltage is applied between two electrodes 32 and 36, lithium ions are implanted from the counter electrode 35 to the working electrode 33 through the ion conduction layer 34 or discharged from the latter electrode to the former electrode to make the color of the working electrode 33 change reversibly. If the electrode 36 is made of a transparent material, the color change of the working electrode can be observed through both of the glass substrates 31 and 37.

However, this type of electrochromic display device using HOPG for the working electrode has some disadvantages as follows.

The device having an ion conduction layer of an organic solvent has an inferior stability even though it has a quick response of about 0.2 second.

HOPG used for the working electrode is apt to take not only lithium atoms but also molecules of the organic solvent used for the ion conduction layer 34 into the layered structure thereof during the action of the device because it has a high crystalline structure and a high orientation. The largeness of each molecule of the organic solvent, when taken into the layered structure, causes the layer distance of HOPG to enlarge considerably and, due to this, the crystalline structure of HOPG is often destroyed. The instability of the display device of this type is caused by the insertion of molecules of the organic solvent into HOPG.

Contrary to the above, in the display device including $Li_3N$ of a solid ion conductor as the ion conduction layer 34, the response speed thereof is lowered considerably though the problem of the instability is solved.

Further, in this structure of the display device, the color change of the graphite intercalation compound can be observed only from a side opposite to the side being contacted with the ion conduction layer 34 of the graphite working electrode 33. Accordingly, it cannot be observed until lithium atoms inserted from the side being contacted with the ion conduction layer have been diffused in the graphite working electrode 33 to opposite side. This is the reason why the response speed is lowered in this type of the display device.

In order to prevent the lowering of the response speed, it is necessary to make the thickness of the graphite working electrode thinner to an order of several hundred Å. Although it is possible to thin HOPG by exfoliation, it is difficult to obtain a uniform thickness of the graphite thin film of several hundred Å thickness thereby. Further, since this type of display device necessitates complicated formation processes, it is not suitable for industrial production.

Also, the cost of HOPG inevitably becomes very high since it is produced through such a difficult heat treatment to be performed under a high pressure at a temperature above 2,000° C. This makes wide use of this type of display device very difficult since various cheaper display devices are available in the market.

SUMMARY OF THE INVENTION

One object of the present invention is to provide a secondary battery capable of displaying the charge and discharge state thereof.

Another object of the present invention is to provide a secondary battery in which the active material of to battery serves as a display means for displaying the charge and discharge state thereof.

A further object of the present invention is to provide an electrochromic display device having stable and quickly responsive displaying function.

In order to accomplish these objects, the present invention provides a secondary battery which is composed of a positive electrode element, a negative electrode element, a separator containing an electrolyte therein which is inserted between the positive electrode element and the negative electrode element and a casing for packaging these elements therein, being characterized in that: either one of the positive and negative electrodes is made of a pyrolytic carbonaceous material which is obtained by thermal decomposition of a hydrocarbon compound selected from benzene, propane and their derivatives at a low temperature of about 1,000° C., said pyrolytic carbonaceous material changing in color due to a change in the stage structure of a graphite intercalation compound formed between adjacent layers which is caused in response to a voltage generated between the positive and negative electrodes; wherein the casing has a transparent window for observing the color change of said pyrolytic carbonaceous material.

In the secondary battery according to the present invention, the color of the electrode element made of an active material changes according to a voltage between two electrodes and the color change can be observed through the window. Namely, the charge and discharge state of the secondary battery can be checked by observing the color of the electrode element.

According to the present invention, there is provided an electrochromic display device which utilizes change in color due to change in the stage structure of a graphite intercalation compound as a working electrode being characterized in that the working electrode is comprised of a pyrolytic carbonaceous material which is obtained by thermal decomposition of a hydrocarbon compound selected from benzene, propane and their derivatives at a low temperature of about 1,000° C., said pyrolytic carbonaceous material having microcrystalline grains of a small radius of about 100 Å.

This electrochromic display device shows a quick response according to a change in the voltage applied thereto and a long durability which guarantees a stable display function.

BRIEF DESCRIPTION OF DRAWINGS

These and other objects and features of the present invention will become more apparent when the preferred embodiment of the present invention is described in detail with reference to the accompanying drawings in that.

DETAILED DESCRIPTION OF THE PREFERRED EMBODIMENT

Figure 1:
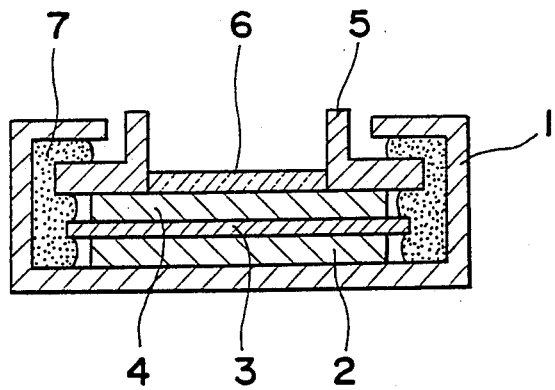
FIG. 1 is a cross-sectional view of a secondary battery according to the present invention.

FIG. 1 shows an example of a flat type secondary battery.

In a casing 1 of an electrically conductive material, a positive electrode 2, a separator 3 and a negative electrode 4 are stacked. The positive electrode 2 is made of $Cr_3O_8$. The separator 3 contains propylene carbonate into which lithium perchlorate of 1 Mol is resolved as an electrolyte. The negative electrode 4 is made of a carbonaceous material which is deposited on a nickel substrate in the thermal vapor deposition of benzene, propane, or their derivatives with use of a low temperature thermal decomposition. On the negative electrode 4, a ring-like negative electrode terminal 5 is formed projected from the aperture of the casing 1 and a sealing element 6 is formed on a circular area of the negative electrode 4 defined by the negative electrode terminal 5. The sealing element 6 is made of a transparent material such as glass so as to be able to observe a color change of the negative electrode 4 therethrough. Namely, the sealing element 6 serves as a window for observing the color change.

Further, an insulating packing 7 is inserted around the inner periphery of the casing 1 so as to insulate the separator 3, the negative electrode 4 and the negative electrode terminal 5 from the casing 1.

It is to be noted that the charge collection effect is enhanced much more by vapor-depositing a transparent electrode such as $In_2O_3$ doped with $SnO_2$ on the surface of the sealing element 6 contacting the negative electrode 4.

Also, it is possible to make the sealing element 6 thinner when a transparent electrically conductive film of, for example, polydiodo carbazole doped with bromine.

A secondary battery manufactured for trial according to the present preferred embodiment has a charge and discharge capacity of 10 mAh. The negative electrode 4 assumes a distinct golden color in the charged state thereof.

The color of the negative electrode 4 is changed to blue after about five hours from starting discharge at a current of 1 mA and to blue black after about eight hours and, after about ten hours, to pure black. Thereafter, when the secondary battery has been fully charged, the negative electrode assumes a distinct golden color again.

The capacity thereof and clearness in the color change are not worsened anymore even after 500 charge-discharge cycles by a current of 1 mA.

THE SECOND PREFERRED EMBODIMENT

Figure 2:
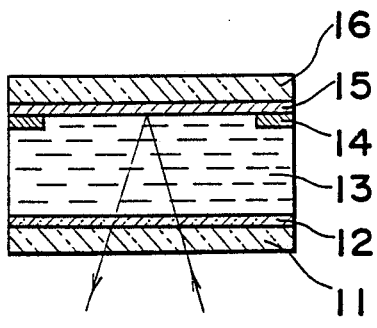
FIG. 2 is a schematic cross-sectional view of an electrochromic display device according to the present invention.

FIG. 2 shows an example of an electrochromic display device according to the present invention.

The device is comprised of a window element 11 of quartz glass, a transparent electrode 12 formed on the window element 11, an ion conduction layer 13 of a liquid electrolyte, a collector frame 14, a working electrode 15 and another window element 16 of quartz glass.

The organic solvent used for the ion conduction layer 13 is dimethylsulphoxide and, as the transparent electrode 12, indium-tin oxide is used.

The working electrode 15 is formed on the window element 16 by thermal decomposition of benzene at a temperature of about 1,000° C. according to CVD method. The pyrolysis carbon film deposited on the other surface of the window element 16 is removed so as to enable observation of the color change of the working electrode 15 therethrough.

It is to be noted that propane and derivatives thereof are also usable to form the working electrode 15 in place of benzene since the pyrolytic carbonaceous material obtained by thermal decomposition of propane is similar to that obtained by the thermal decomposition of benzene.

Figure 3:
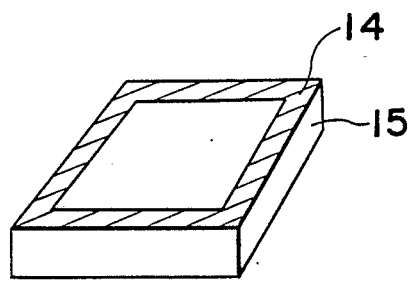
FIG. 3 is a schematic perspective view for showing the collector to be formed on the working electrode of the electrochromic display device shown in FIG. 2.
Figure 5:
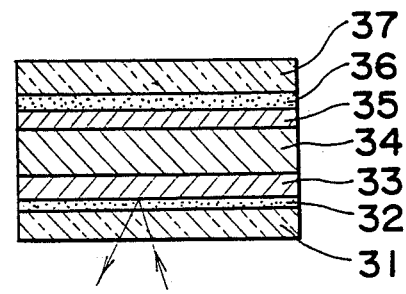
FIG. 5 is a schematic cross-sectional view of a conventional electrochromic display device.

As shown in FIG. 3, the collector frame 14 of nickel is arranged on the working electrode 15.

Lithium atoms are implanted into the pyrolytic carbonaceous film forming the working electrode 15 so as to have the component of the first stage. After implanting lithium atoms, all of elements are assembled to form an electrochromic display device.

When a voltage of $(-3)$ V is applied between two electrodes 12 and 15, the working electrode 15 assumes a golden color of lithium-graphite intercalation compound ($C_6Li$) of the first stage and, when a voltage of $(-1.5)$ V is applied, it assumes a blue color of that of the second stage ($C_{12}Li$).

As is apparent from the above that the working electrode 15 made by thermal decomposition of propane or derivatives of propane also shows the same color change as that made by thermal decomposition benzene or derivatives of the same.

Response time interval in the color change is 0.2 second and the device shows a stable display function after driving the same 8 million times.

The pyrolytic carbonaceous material according to the present invention is obtained by the thermal decomposition of a hydrocarbon compound at a temperature of about 1,000° C. and is a collection of microcrystals having a graphite structure. This carbonaceous material is discriminated from the pyrolysis graphite such as HOPG having a well grown graphite crystalline structure.

The graphite microcrystals usually have a random arrangement, however, when the CVD method is used for the compositing method and compositing conditions are properly controlled, the orientation between microcrystals is improved. This enables a pyrolytic carbonaceous material to be obtained having a high orientation such that randomness in the direction of the C-axis falls in a range defined between $\pm 45°$.

The pyrolytic carbonaceous material forms an intercalation compound by taking relatively small atomic species such as lithium between layers thereof which shows changes in the stage structure and in the color thereof similar to HOPG. Especially, the pyrolytic carbonaceous material has a diffusion speed of atomic species in the thin film thereof as fast as that of HOPG.

Small atomic species such as lithium atoms are diffused into graphite not only between layers of the graphite microcrystals but also through passages defined by lattice defects formed in the graphite crystal. The present pyrolytic carbonaceous material has many more lattice defects when compared with the pyrolytic graphite such as HOPG and, therefore, is suitable for the insertion of small atomic species.

On the contrary, large molecules such as molecules of an organic solvent are diffused into graphite only through paths defined between layers of microcrystals in such a manner that they travel from one microcrystal to an adjacent microcrystal. Accordingly, the intercalation compound having a large insertion species is hardly formed in the present pyrolytic carbonaceous material wherein the orientation between adjacent microcrystals is inferior and many boundaries are formed among the microcrystals.

Although present pyrolytic carbonaceous material has a high orientation a pyrolytic carbon, it has a lesser orientation when compared with HOPG (which has a randomness in the direction of C-axis falling in a range of $\pm 1°$) and microcrystalline grains of about 100 Å radius which is far smaller than the radius of about 1 $\mu m$ in HOPG. Thus, the insertion of large molecules such as those of an organic solvent is never caused in the present carbonaceous material. Therefore, the color change thereof can be stabilized since only small atomic species such as lithium atoms contribute to the color change.

And the color of the negative electrode 4 is changed sensitively to the voltage applied between two electrodes. Thus, the charge and discharge state of the secondary battery is easily detected by observing the color of the negative electrode 4 through the window 6.

THE THIRD PREFERRED EMBODIMENT

Figure 4:
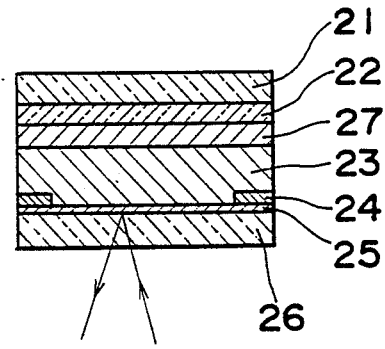
FIG. 4 is a schematic cross-sectional view of another electrochromic display device according to the present invention.

FIG. 4 shows another example of the electrochromic display device according to the present invention.

The device is comprised of a glass substrate 21, a transparent electrode 22, a lithium electrode 27 formed on the electrode 22 as one of the counter electrodes, an ion conduction layer 23 of $Li_3N$ being a solid electrolyte, a collector 24, a working electrode 25 and another glass substrate 26.

The working electrode 25 is formed according to the same method as in the second preferred embodiment. The color change of the working electrode 25 is observed through the glass substrate 26.

The electrochromic display device shows the color change substantially similar to that of the second preferred embodiment.

The response time interval in the color change is 0.3 second.

Thus, the electrochromic display device according to the present invention shows a quick response for the color change according to an applied voltage between two electrodes.

Further, it shows a stable display function since only small atomic species contribute to the color change of the working electrode.

The preferred embodiments described herein are illustrative and not restrictive, the scope of the invention being indicated by the appended claims and all variations which come within the meaning of the claims are intended to be embraced herein.

What is claimed is:

1. A secondary battery which is composed of a positive electrode element, a negative electrode element, a separator containing an electrolyte therein which is inserted between the positive electrode element and the negative electrode element and a casing for packaging these elements therein, being characterized in that:
    either one of the positive and negative electrode is made of a pyrolytic carbonaceous material which is obtained by thermal decomposition of a hydrocarbon compound selected from benzene, propane and their derivatives at a low temperature of about 1,000° C., said pyrolytic carbonaceous material changing in the color thereof due to a change in stage structure of a graphite intercalation compound formed between adjacent layers which is caused in response to a voltage generated between the positive and negative electrodes; wherein the casing has a transparent window for observing the color change of said pyrolytic carbonaceous material.

2. An electrochromic display device which utilizes a change in color due to a change in the stage structure of a graphite intercalation compound as a working electrode being characterized in that the working electrode is comprised of a pyrolytic carbonaceous material which is obtained by thermal decomposition of a hydrocarbon compound selected from benzene, propane and their derivatives at a low temperature of about 1,000° C., said pyrolytic carbonaceous material having microcrystalline grains of a small radius of about 100 Å.

* * * * *